US008806176B2

(12) United States Patent
Branson et al.

(10) Patent No.: US 8,806,176 B2
(45) Date of Patent: Aug. 12, 2014

(54) APPLYING ADVANCED ENERGY MANAGER IN A DISTRIBUTED ENVIRONMENT

(75) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 13/031,915

(22) Filed: Feb. 22, 2011

(65) Prior Publication Data

US 2012/0216014 A1  Aug. 23, 2012

(51) Int. Cl.
*G06F 9/52* (2006.01)
*G06F 9/38* (2006.01)
*G06F 9/50* (2006.01)
*G06F 11/16* (2006.01)
*G06F 17/30* (2006.01)

(52) U.S. Cl.
CPC .. *G06F 9/52* (2013.01); *G06F 9/38* (2013.01); *G06F 9/505* (2013.01); *G06F 9/3851* (2013.01); *G06F 11/1683* (2013.01); *G06F 17/30516* (2013.01)
USPC .......................................................... 712/25

(58) Field of Classification Search
CPC ..................................... G06F 9/38; G06F 9/52
See application file for complete search history.

(56) References Cited

U.S. PATENT DOCUMENTS

| 7,496,683 | B2 * | 2/2009 | Lang et al. | 709/241 |
| 7,844,796 | B2 * | 11/2010 | Vorbach et al. | 712/18 |
| 2007/0168686 | A1 * | 7/2007 | Pessolano | 713/500 |
| 2008/0084893 | A1 * | 4/2008 | Lee | 370/410 |
| 2009/0313400 | A1 * | 12/2009 | Amini et al. | 710/29 |

* cited by examiner

*Primary Examiner* — Eric Coleman
(74) *Attorney, Agent, or Firm* — Patterson & Sheridan LLP

(57) ABSTRACT

Techniques are described for abating the negative effects of wait conditions in a distributed system by temporarily decreasing the execution time of processing elements. Embodiments of the invention may generally identify wait conditions from an operator graph and detect the slowest processing element preceding the wait condition based on either historical information or real-time data. Once identified, the slowest processing element may be sped up to lessen the negative consequences of the wait condition. Alternatively, if the slowest processing element shares the same compute node with another processing element in the distributed system, one of the processing elements may be transferred to a different compute node to free additional computing resources on the compute node.

21 Claims, 8 Drawing Sheets

APPLYING ADVANCED ENERGY MANAGER IN A DISTRIBUTED ENVIRONMENT

BACKGROUND

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments of the invention provide a method, system and computer program product for processing data in a stream application. The method, system and computer program product receive data to be processed by a plurality of processing elements, where the processing elements each process at least a portion of the received data. The method, system and computer program product establish an operator graph of processing elements, the operator graph defining at least one execution path and each processing element of the operator graph is configured to receive data from at least one upstream processing element and transmit data to at least one downstream processing element. The method, system and computer program product identify a downstream processing element that receives data separately from at least two upstream processing elements and speeds up the processing of at least one of the processing elements that precedes the downstream processing element in the at least one execution path.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
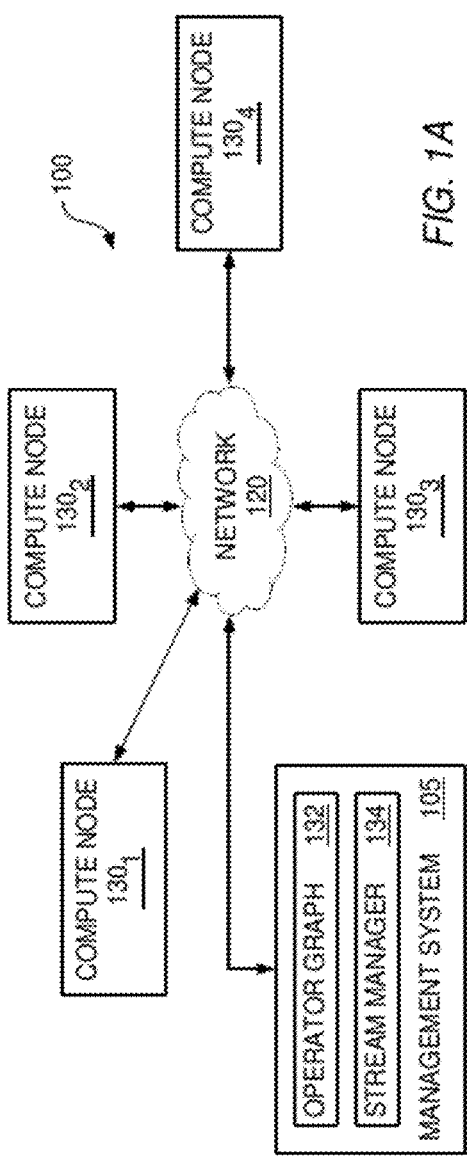
FIGS. 1A-1B illustrate a computing infrastructure 100 configured to execute a stream application, according to one embodiment of the invention.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream application, operators are connected to one another such that data flows from one processing element to the next (e.g., over a TCP/IP socket). Scalability is reached by distributing an application across nodes by creating many small executable pieces of code (i.e., operators), as well as replicating processing elements on multiple nodes and load balancing among them. Processing elements (and operators) in a stream application can be fused together to form a larger processing element. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream application, as well as fused or un-fused from a stream application during runtime.

One advantage of stream applications is that they allow the user to granularly control the process flow of data through the application. In other words, the user may designate specific operators for each processing element that perform various operations on the incoming data, and may dynamically alter the stream application by modifying the operators and the order in which they are performed. Additionally, stream applications are able to handle large volumes of data while limiting any "bottlenecks" in the processing.

However, because stream applications often deal with large volumes of data, the processing of which is spread over multiple processing elements across multiple compute nodes, this presents additional challenges for application programmers and database developers. One such challenge is identifying bottlenecks that arise because of wait conditions. In general, wait conditions are processing elements which receive data from two or more processing elements that directly precede the wait condition in the stream. As an example, a particular processing element may need data from two separate processing elements before performing a certain operation. If, however, one of the processing elements provides data to the particular processing element at a slower rate than the other processing element, the particular processing element is limited by the slowest processing element in the flow of data. This bottleneck can decrease an application's throughput.

An Active Energy Manager (AEM) reduces the effects of these bottlenecks by increasing the execution time of a processing element or elements. Stated differently, the AEM is a tradeoff between a stream application's throughput and the energy needed to run the stream. Whenever a bottleneck is identified, the AEM speeds up the execution time of a slow processing element by temporarily expending more energy to speed up the execution time—e.g., overclocking an associated processor.

Embodiments of the invention provide techniques for identifying wait conditions from an operator graph and speeding up execution of processing elements preceding the wait condition on the graph. In particular, embodiments of the invention may use historical information collected from multiple executions of a particular application to determine process times for each processing element and speed up execution for the slowest processing element that provides data to the wait condition. Alternatively, instead of using historical data, real-time indicators (e.g., buffers) may be monitored to indicate which processing elements have the slowest throughput, and therefore, should be sped up. Additionally, embodiments of the invention may determine that at least two processing elements preceding the wait condition are on the same compute node and split up these elements onto different compute nodes. Finally, if the slowest processing element preceding a wait condition shares a common space as another processing element in the operator graph (e.g., on the same node or server) then the slower processing element may be sped up while the other processing element is slowed down so that application throughput is increased but net energy remains the same.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream application may be virtual machines hosted by a cloud service provider. Doing so allows a user to access this information from any computing system attached to a network connected to the cloud (e.g., the Internet).

Figure 1B:
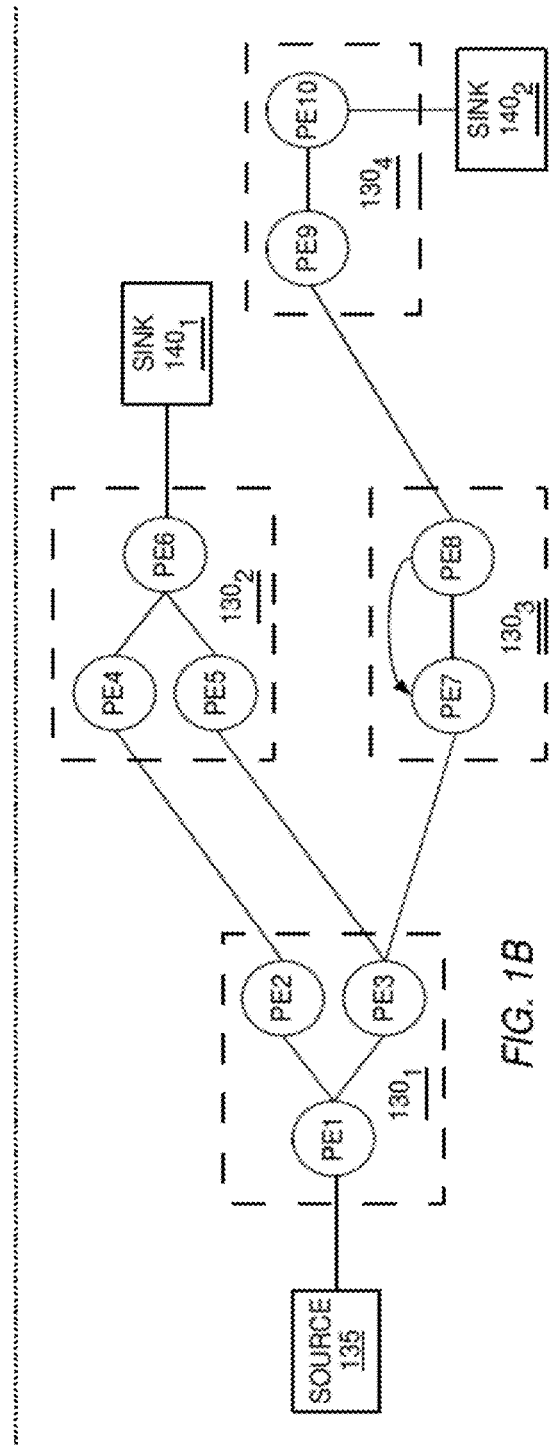

FIG. 1A-1B illustrate a computing infrastructure configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream application beginning from one or more source processing elements (PEs) through to one or more sink PEs. This flow from source to sink is also generally referred to herein as an execution path. Generally, data attributes flow into a source PE of a stream application and are processed by that PE. Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. Additionally, the processing elements could be configured to receive or emit data in formats other than an N-tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream application running on the compute nodes $130_{1-4}$, as well as to change the structure of the operator graph 134. The stream manager 134 may move processing elements (PEs) from one compute node 130 to another, for example, to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$. Additionally, the stream manager 134 may request that a compute node 130 speeds up the execution of one or more of the processing elements. This will be discussed in greater detail below.

In one embodiment of the invention, the management system 105 may maintain multiple operator graphs 132. In such an embodiment, one operator graph 132 is designated as the primary operator graph, which represents the general or default processing flow, while the other operator graphs may represent alternate processing flows.

FIG. 1B illustrates an example operator graph that includes ten processing elements (labeled as PE1-PE10) running on the compute nodes $130_{1-4}$. While a processing element may be executed as an independently running process with its own process ID (PID) and memory space, multiple processing elements may also be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
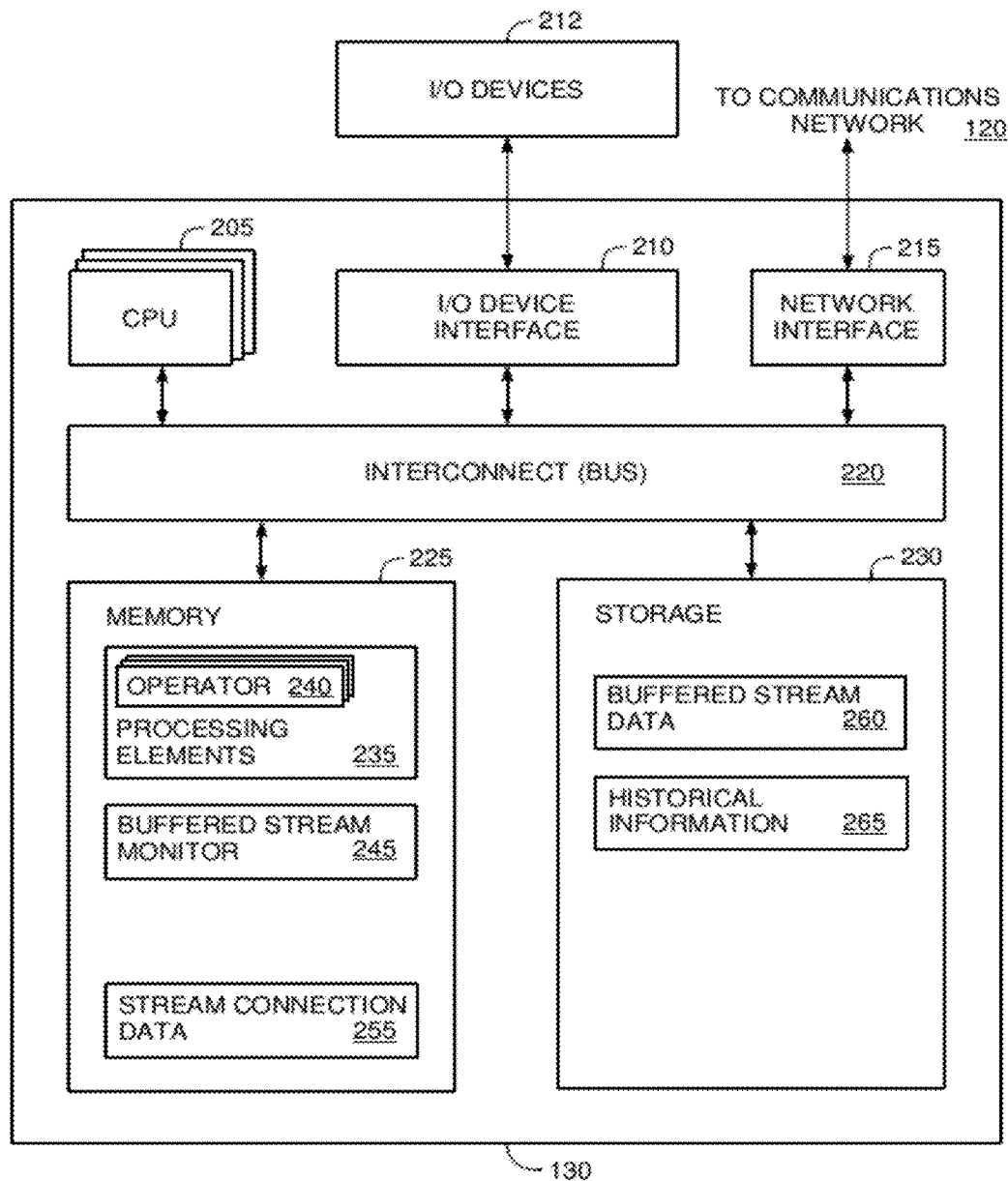
FIG. 2 is a more detailed view of the compute node 130 of FIGS. 1A-1B, according to one embodiment of the invention.

FIG. 2 is a more detailed view of the compute node 130 of FIGS. 1A-1B, according to one embodiment of the invention. As shown, the compute node 130 includes, without limitation, at least one central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory. Storage 230, such as a hard disk drive, solid state device (SSD), or flash memory storage drive, may store non-volatile data.

In this example, the memory 225 includes a plurality of processing elements 235, buffered stream monitor 245 and stream connection data 255. Each PE 235 includes a collection of operators 240. As noted above, each operator 240 may provide a small chunk of executable code configured to process data flowing into a processing element (e.g., PE 235) and to emit data to other operators 240 in that PE and to other processing elements in the stream application. Such processing elements may be on the same compute node 130 or on other compute nodes accessible over the data communications network 120. The stream connection data 255 represents the connections between PEs on compute node 130 (e.g., a TCP/IP socket connection between two separate PEs 235), as well as connections to other compute nodes 130 with upstream and or downstream PEs in the stream application, also via TCP/IP sockets (or other inter-process data communication mechanisms).

As shown, storage 230 contains buffered stream data 260 and historical information 265. The buffered stream data 260 represents a storage space for data flowing into the compute node 105 from upstream processing elements (or from a data source for the stream application). For example, buffered stream data 260 may include data tuples waiting to be processed by one of the PEs 235. Buffered stream data 260 may also store the results of data processing performed by processing elements 235 that will be sent to downstream processing elements. For example, a PE 235 may have to store tuples intended for a downstream PE 245 if that PE 235 already has a full buffer. On the other hand, the historical information 265 is formulated after running a particular stream application several times. Historical information 265, for example, can be the average of the amount of data stored in the buffered stream data 260 during a series of executions of an application. In sum, the buffered stream data 260 is a real-time measurement while the historical information 265 is a predictor of how a PE 235 on a compute node 130 will process tuples based on prior stream applications—i.e., whether the PE 235 will create a bottleneck.

Associated with the buffered stream data 260 is the buffered stream monitor 245 which evaluates the amount of data stored in the buffer 260. Typically, if the buffered stream monitor 245 determines that the buffer is nearly full of received buffered stream data 260, this indicates that the processing element on that compute node 130 is running behind, thereby creating a bottleneck in the execution path. The buffered stream monitor 245 then reports this latency to the stream manager 134 found on the server computing system 105. Conversely, the buffered stream data 260 may be full because the buffer for downstream PE in the execution path is already full. In such a case, the buffer stream monitor 245 would not report that the PE 235 is creating a bottleneck.

Figure 3:
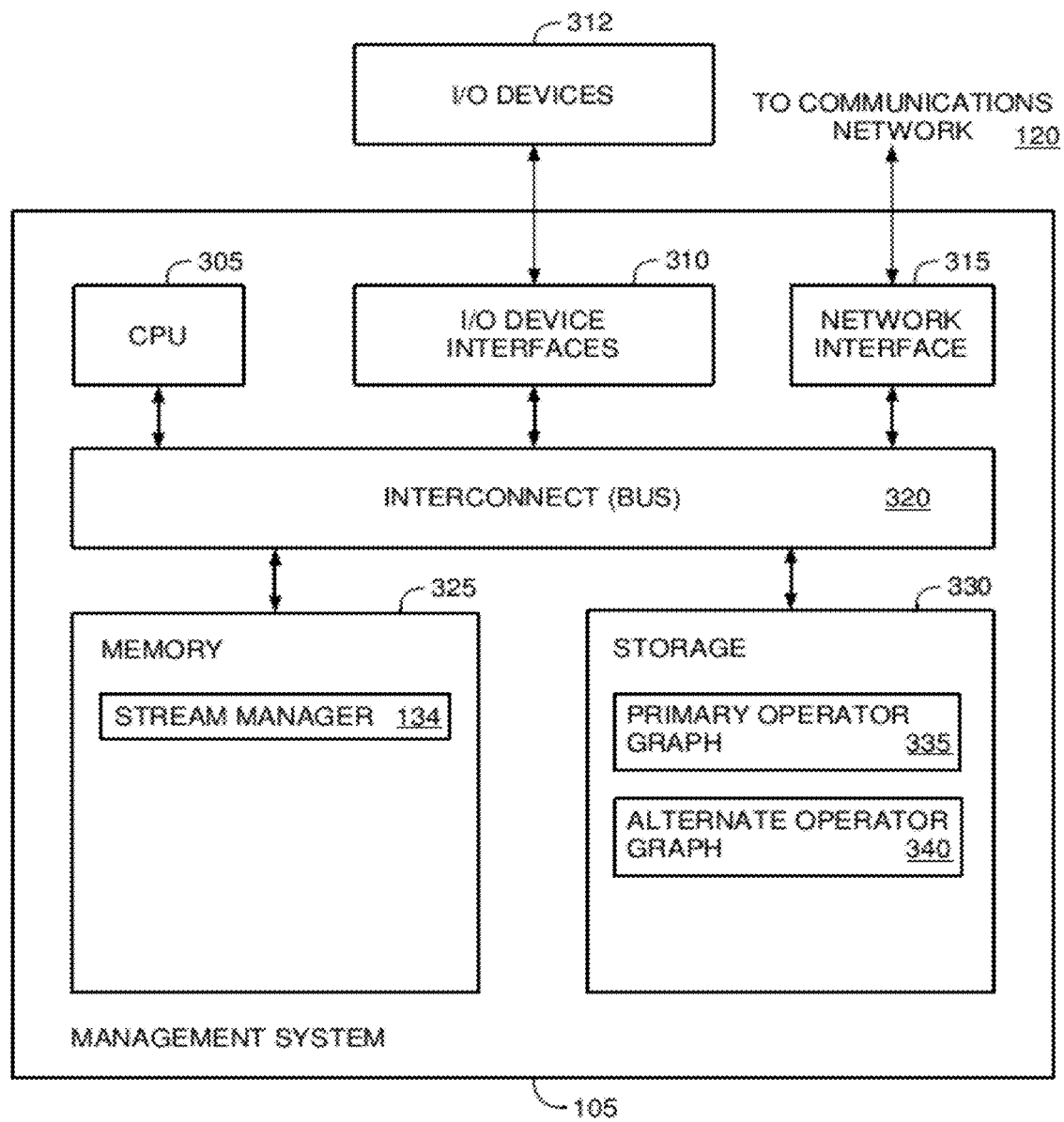
FIG. 3 is a more detailed view of the server computing system 105 of FIG. 1, according to one embodiment of the invention.

FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 335 and an alternate operator graph 340. The stream manager 134 may generally route tuples received as part of a data stream to PEs 235 to be processed, according to the primary operator graph 335. Additionally, the stream manager 134 can access the historical information 265 and buffered stream monitor 245 located on each compute node 130. These two elements provide the stream manager 134 with the necessary information to speed up execution of individual PEs 235 as discussed in the methods below. For example, if the buffered stream monitor 245 reports to the stream manager 134 that the buffer is nearly full of received N-tuples, the stream monitor 245 may authorize the compute node 134, which contains the corresponding PE 235, to overclock the associated CPU 205 to remove the bottleneck. Alternatively, the stream manager 134 may identify that a wait condition is dependent on two PEs 235 on the same compute node 130. In such a scenario, the stream manager 134 can use an alternate operator graph 240 which moves one of the PEs 235 to a different compute node 130. Advantageously, using the alternate operator graph 340 would place the PE 235 on a different compute 130 that has additional system resources (e.g., more processors) to speed up execution. The stream manager 134 may then use the alternate operator graph 340 as the primary operator graph 335.

Figure 4:
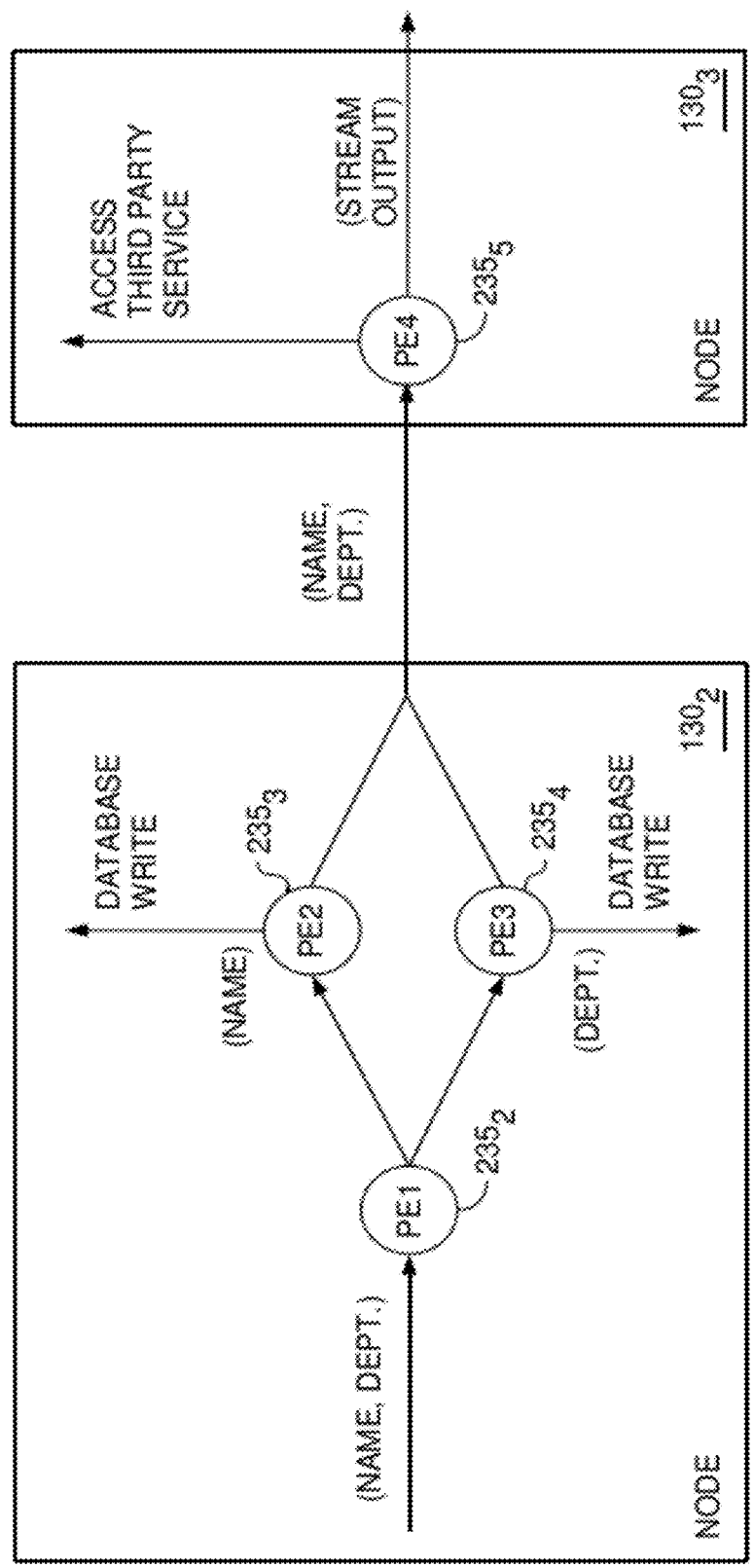
FIG. 4 illustrates an example of compute nodes in a stream application which create a wait condition, according to one embodiment of the invention.

FIG. 4 illustrates an example of compute nodes in a stream application that create a wait condition, according to one embodiment of the invention. As shown, compute node $130_2$ includes three processing elements $235_2$, $235_3$ and $235_4$ (labeled PE1-PE3) while compute node $130_3$ contains PE $235_5$ (PE4). In the depicted example, PE1 receives an N-tuple data stream and emits an N-tuple to PE2 and PE3 on compute node $130_2$. Processing elements PE2 and PE3, in turn, emit N-tuples to PE4 on compute node $130_3$. In this example, the PE1 receives a tuple which includes attributes <name, department>. PE1 takes this N-tuple, separates the attributes, and generates one set of tuples sent to PE2 (<name>) and another set of tuples sent to PE3 (<department>). In turn, PE2 and PE3 perform a database write for each tuple received from PE1 and send the tuple to PE4. Once received, PE4 concatenates the tuples back into the <name, department> format, accesses a third-party web service, and generates a tuple that is sent further downstream in the stream application.

Continuing the example, PE1 divided the tuple into a <name> tuple and a <department> tuple and sent each tuple to a different processing element 235 since both were written to separate databases. This example is a typical method implemented by a distributed system to increase throughput. However, PE4 cannot move onto the next tuple until it has received both the <name> tuple from PE2 and the <department> tuple from PE3. Thus, no matter how fast PE2 writes the tuple to the database and relays the tuple to PE4, PE4 cannot continue until PE3 sends the corresponding tuple. Thus, FIG. 4 exemplifies a wait condition.

Figure 5:
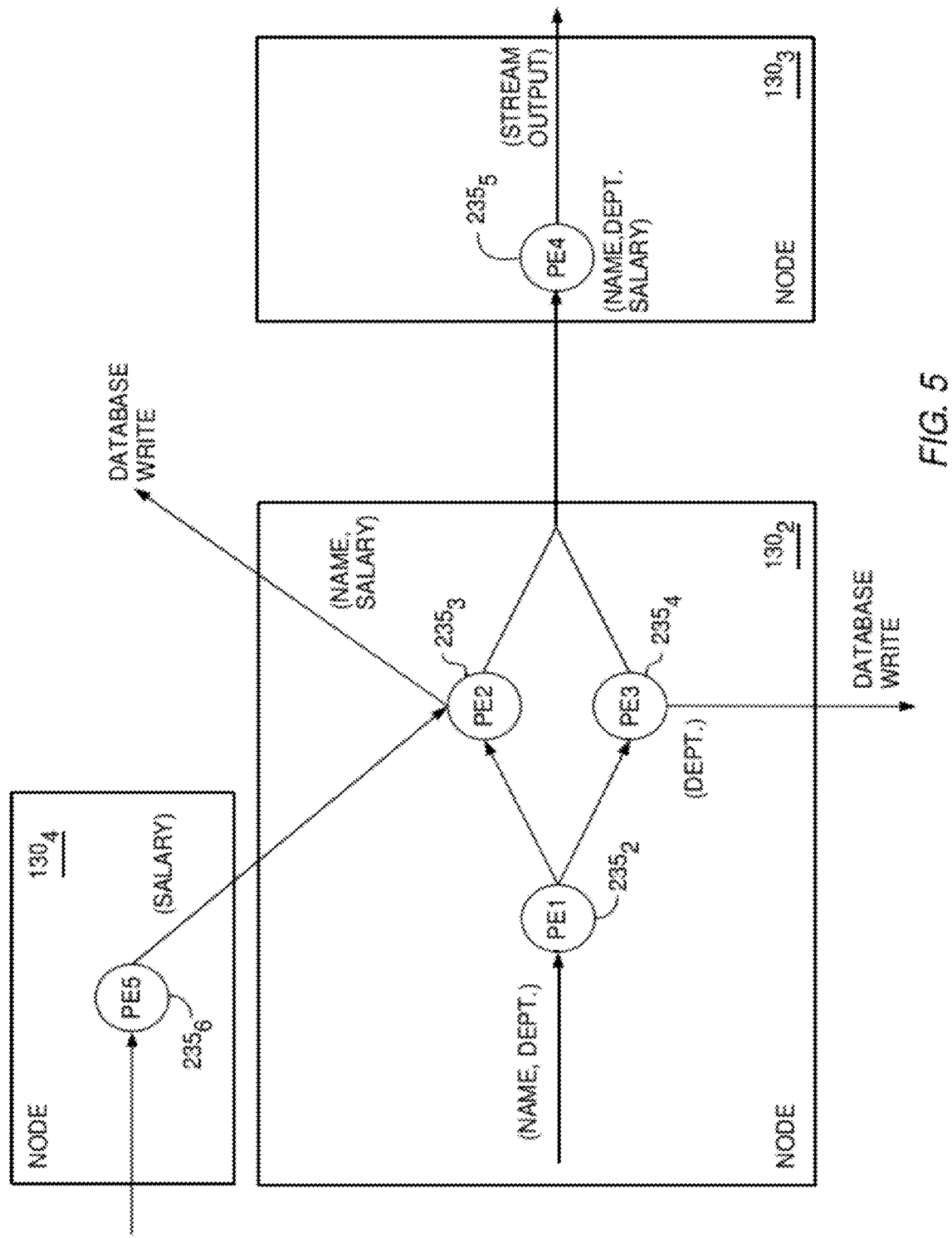
FIG. 5 illustrates an example of compute nodes in a stream application, according to one embodiment of the invention.

FIG. 5 illustrates an example of compute nodes in a stream application that creates a wait condition, according to one embodiment of the invention. As shown, compute node $130_2$ includes three processing elements $235_2$, $235_3$ and $235_4$ (labeled PE1-PE3). In the depicted example, processing element $235_2$ receives an N-tuple data stream and emits an N-tuple to processing elements $235_3$ and $235_4$ (labeled PE2 and PE3, respectively) on compute node $130_3$. Further, compute node $130_4$ includes processing element $235_6$ (PE5) which emits an N-tuple to PE2 with the attribute of <salary>. Processing elements PE2 and PE3, in turn, emit N-tuples to processing element $235_5$ (PE4) on compute node $130_3$. In this example, PE $235_2$ (labeled PE1), receives a tuple which includes attributes <name, department>. PE1 takes this N-tuple, separates the N-tuple, and generates one set of tuples sent to PE2 (<name>) and another set of tuples sent to PE3 (<department>). PE2 then concatenates the tuple received by PE5 and PE1. In turn, PE2 and PE3 perform a database write for each received tuple and send the tuple to PE4. Once received, PE4 concatenates the tuples into the <name, department, salary> format and generates a tuple that is sent further downstream in the stream application.

In this example, PE4 remains a wait condition as shown previously in FIG. 4; however, PE2 is now another wait condition. In one embodiment, PE2 is slower than PE3 since it must write into a database both the name and salary attributes. Thus, the wait condition found at PE4 could be abated by speeding up the execution of PE2—i.e., overclocking the processor associated with the compute node $130_2$. In another example, however, assume that PE2 can perform its database write as quickly as PE3, but PE5 sends a tuple to PE2 at half the rate of PE1. In that case, PE5 would slow down PE2, and thus, PE4. Overclocking PE2 would not alleviate the wait condition at PE4; however, speeding up the execution of PE5 would. This example illustrates that a processing element that needs to be sped up does not necessarily have to be located immediately prior to a wait condition.

In another embodiment, the stream manager 134 identifies a hierarchy of wait conditions, e.g., PE4 is the parent and PE2 is the child. Thus, the stream manager 134 would start at the wait condition closest to the end (PE4) and evaluate the prior PEs 235. If none of these were executing slowly, then the stream manager 134 would move to the next wait condition (PE2). Continuing the example above, the stream manager 134 would then determine that PE5 is creating the bottleneck and act accordingly.

Figure 6:
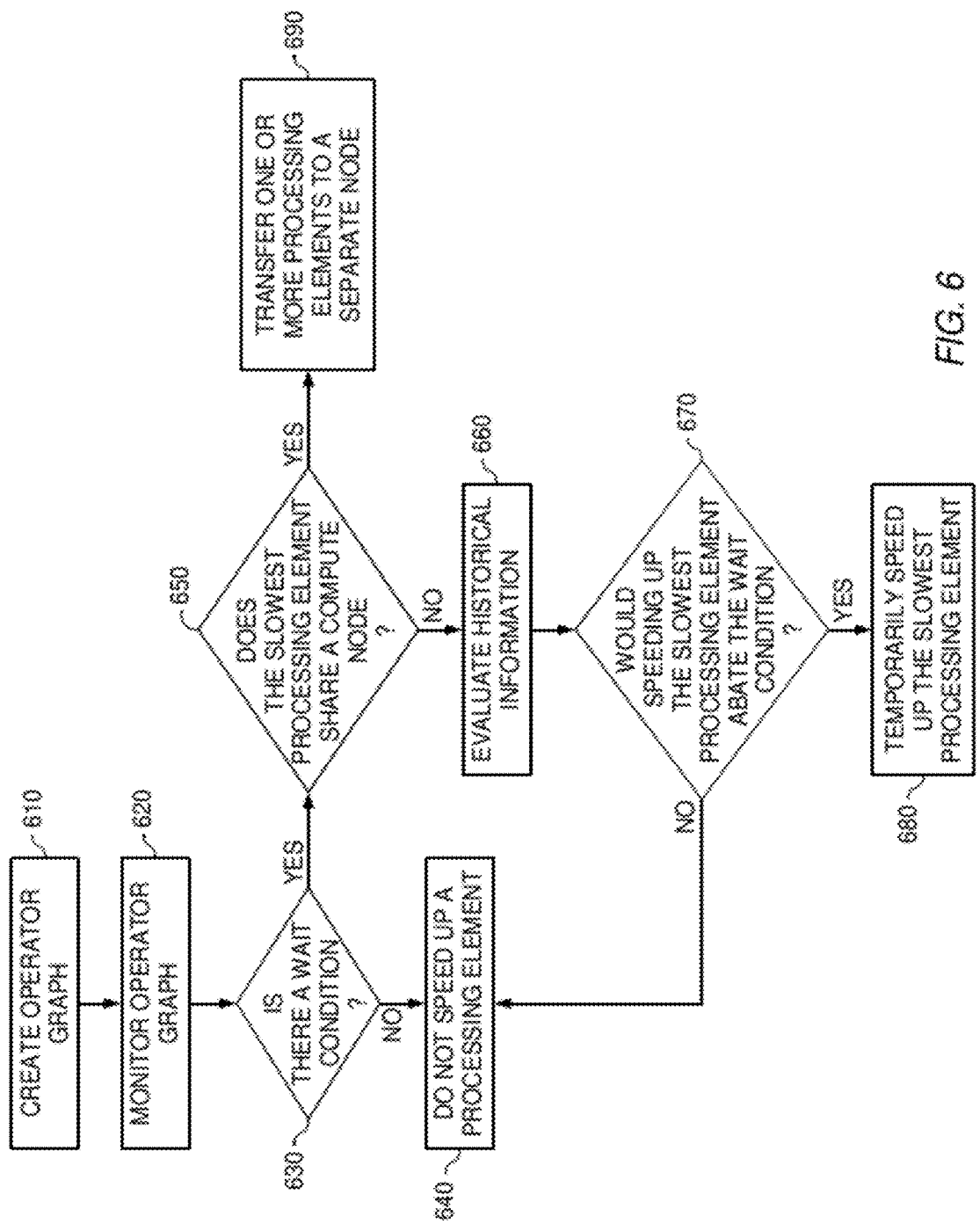
FIG. 6 is a flow diagram illustrating a method of active energy management in a distributed environment, according to one embodiment of the invention.

FIG. 6 is a flow diagram illustrating a method of performing Active Energy Management to alleviate wait conditions found in a distributed system, according to one embodiment of the invention. In step 610, the management system 105 creates an operator graph 132 for the stream application (e.g., the operating graph shown in FIG. 1B). In general, the operator graph 132 records the different PEs 235 in the execution path of a stream application. These PEs 235 may be located on individual compute nodes 130 or share processing space. Each PE 235 is associated with a buffered stream data 260 and a buffered stream monitor 245 on the compute node 130 that monitor the amount of data stored in a buffer. Moreover, as a stream application runs more than once, the compute nodes 130 gather historical information 265 which determines the latency of any given PE 235. For this embodiment, assume that the stream application has run previously, and thus, the historical information 265 is not null.

After the operator graph is created and the stream application begins to run, at step 620 the stream manager 134 continues to monitor the different PEs. The buffered stream monitor 245 feeds real-time information to the stream manager 134, as well as the stream manager 134 having access to the historical information 265 located at each compute node 130. For example, the historical information 265 may contain the burst rate of the tuples.

As step 630, the stream manager 134 evaluates the operator graph 132 and determines whether a wait condition exists. If not, the stream manager 134 does not speed up the execution of a particular PE 640. Otherwise, the stream manager 134 will speed up an upstream PE 235 according to the methods described above.

In one embodiment of step 650, the stream manager 134 uses the operator graph 132 to ascertain whether transferring the slow PE 235 to a different compute mode will speed up the wait condition. For example, referring to FIG. 4, PE2 and PE3 are found on the same compute node $130_2$. Instead of manually increasing the processor speed of node $130_2$, at step 690 the stream manager 134 transfers the PE 235 to a compute node 130 with additional processing power. As discussed previously, the stream manager 134 may use the alternate operator graph 340 to transfer the PE 235. Thus, the application throughput is increased while energy is conserved. If transferring the slower PE 235 does not alleviate the problem because the PE 235 does not share a compute node 130 (e.g., such is the case with PE5 of FIG. 5) the stream manager 134—at step 660—may next evaluate the historical information 265.

Historical information 265 is a record containing the efficiency of each PE 235. For example, historical information 265 can include the percentage of the buffer used by the PE 235. A high percentage correlates to a low throughput, i.e., the PE 235 was constantly processing data slower than the processing element(s) 235 sending the PE 235 data. Additionally, the stream manager 134 may evaluate the historical information 265 for each PE 235 collectively. In other words, to understand where the bottleneck is occurring, the stream manager 134 determines which PE 235 has the least throughput. Referring to FIG. 5, PE2 may have associated historical information 265 that indicates a high level of latency. Nonetheless, much of that latency could be caused by PE1 delivering tuples at twice the rate as PE5. PE2 stores those tuples in the buffered stream data 260 while waiting for the corresponding tuple from PE5. However, after evaluating the historical information 265 for each processing element 235 preceding the wait condition, the stream manager 134 verifies that PE5 is indeed the processing element 235 that needs to be sped up.

In another embodiment, the buffered stream monitor 245 may provide real-time data (in contrast to historical information 265) to the stream manager 134. For example, the stream manager 134 gives precedence to the real-time data being generated by the buffered stream monitor 245 over the historical information 265 formulated by evaluating previous stream applications. In such a case, the stream manager 134 waits until a buffered stream monitor 245 reports that an associated PE 235 has a buffer that is nearly full. To determine whether to speed up that PE 235, the stream manager 134 may employ various numbers of techniques, such as a static or dynamic threshold dependent on system conditions. However, much like with historical information 265, at step 670, each of the buffered stream monitors 245 may be considered collectively to ensure the correct processing element 235 is sped up. Continuing the example above, PE2 uses a high percentage of the buffer since the tuples sent from PE1 must be stored while PE2 waits for the corresponding tuples from PE5. But if PE5 is the slower of the two processing element, then PE5 will, by comparison, use an even higher percentage of the buffer. In other words, PE2 is another wait condition like PE4; thus, overclocking PE2 would not increase throughput since PE2 must still wait for input from PE5.

In addition, the stream manager 134 may equalize the data received by the buffered stream monitor 245. If, for example, PE2 concatenated tuples that were received from four different processing elements, but one of the PEs sent tuples at a rate of half as fast as the others, the buffer used by PE2 would quickly fill up while waiting for tuples from the slow processing element. In other words, without equalization, the buffer associated with PE2 may appear to be used at much higher percentage than the buffer associated with the slow PE that is actually causing the bottleneck. Thus, the stream monitor 245 may use the operator graph 132 to determine the number of PEs 235 sending tuples to a given PE 235 and divide the percentage of buffer usage by that number, thereby equalizing the percentage. Accordingly, if the slower processing element is actually causing the bottleneck, then comparing the equalized buffer-usage percentages for each PE 235 informs the stream manager 134 which PE 235 should be sped up.

After determining which processing element 235 is causing the bottleneck, at step 680 the stream manager 134 then speeds up that PE 235. In one embodiment, the CPU 205 on the associated compute node 130 is overclocked. However, "overclocking" is a general term that encompasses running a variety of computer components at a higher clock rate than the components were designed for. In addition to overclocking a CPU 205, video cards, motherboard chipsets and RAM may all be overclocked to increase the execution of a PE 235.

Further, overclocking a computer component requires more energy from the compute node 130, which in turn produces more heat and may hasten a hardware component's degeneration. In general, the greater the clock rate is increased, the greater is the degeneration. Thus, in one embodiment, the stream manager 134 overclocks a hardware component temporarily so as not to affect the component's lifetime. Moreover, the stream manager 134 may limit the amount of overclocking one component can undergo, for example, overclocking a CPU 205 once every twelve hours. Alternatively, instead of limiting overclocking by considering the effect on the component's lifetime, the stream manager 134 may limit overclocking by the amount of energy that may be used. In that embodiment, the stream manager 134 has a certain amount of extra energy that can be expended during a defined time period. Accordingly, the stream manager 134 selectively rations the energy. Once the energy is consumed, overclocking is no longer an option. Nonetheless, one of ordinary skill in the art will recognize that embodiments of the present invention may be configured to operate with any method of speeding up a processing element according to the functions described herein.

Moreover, the stream manager 134 can overclock either aggressively to force a PE 235 to quickly process tuples in the buffer, or overclock slightly to allow a PE 235 to maintain or slowly catch up. Each approach has different benefits and detriments. For example, aggressive overclocking permits the PE 235 to catch up quickly and allows for longer cool-off periods. Conversely, slight overclocking uses less energy over time (assuming a non-linear consumption of energy) and operates components at a more consistent temperature.

Figure 7:
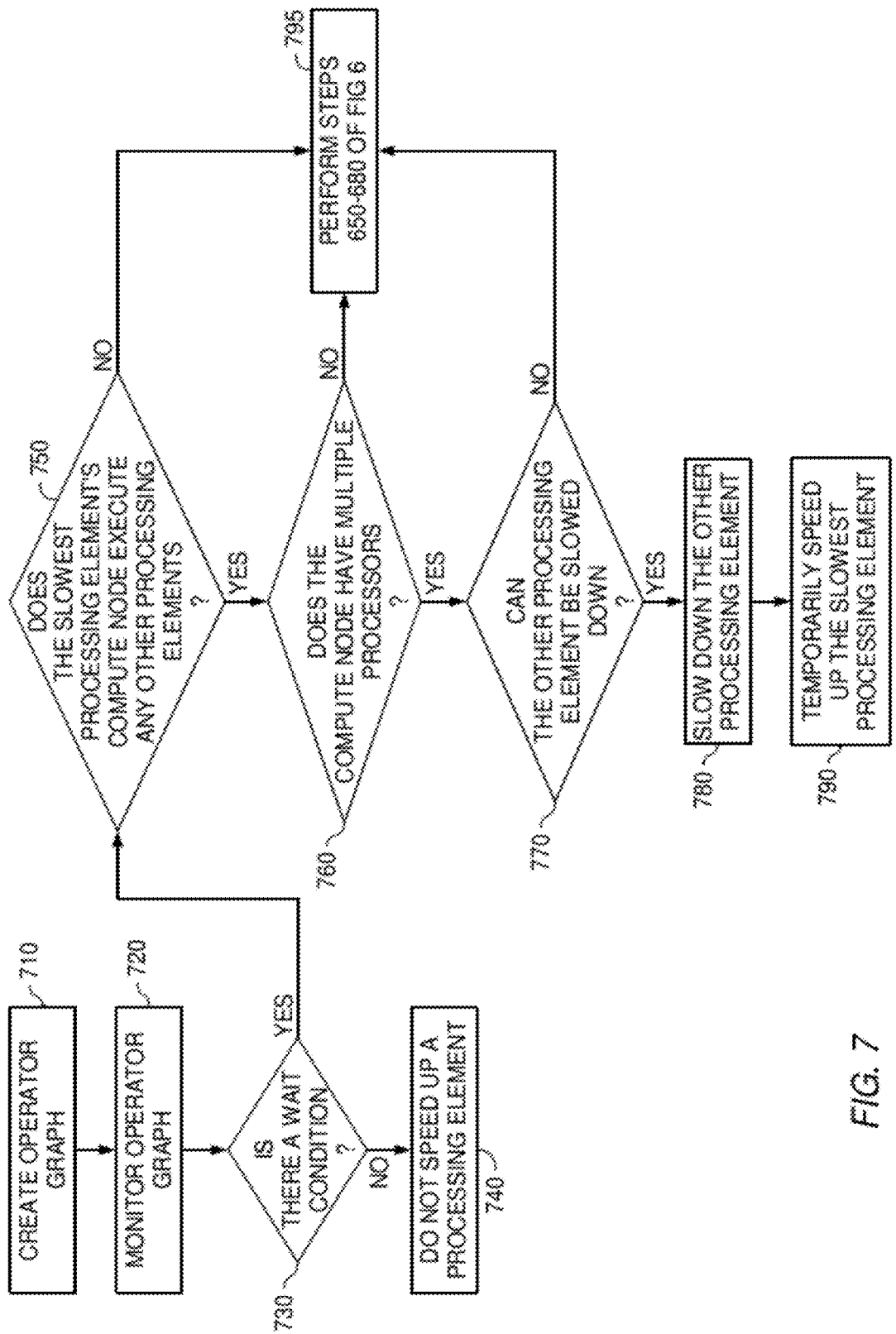
FIG. 7 is a flow diagram illustrating a method of active energy management in a distributed environment, according to one embodiment of the invention.

FIG. 7 is a flow diagram illustrating a method of using AEM to alleviate wait conditions found in a distributed system, according to one embodiment of the invention. Specifically, FIG. 7 illustrates a method that overclocks one CPU but underclocks another. The stream manager 134 creates an operator graph (step 710), monitors the graph (step 720), and identifies processing elements 235 that are wait conditions (step 730). At step 750, the stream manager 134 then determines the PE 235 with the slowest throughput that precedes the wait condition on the execution path. At step 760, the stream manager 134 uses the operator graph 132 to ascertain whether the PE 235 with the greatest latency shares a compute node 130 with other PEs 235 of the stream application. For example, as shown in FIG. 5, compute node $130_2$ performs PE1, PE2, and PE3. Because a compute node 130 may use virtualization to perform PEs 235, the compute node $130_2$ may not have a separate processor assigned to each PE 235. Accordingly, at step 760, the stream manager 134 inquires whether the compute node 130 with the slowest PE 235 has multiple processors. In sum, the method illustrated by FIG. 7 requires compute nodes 132 with multiple processors 205 that execute multiple PEs 235.

Next, the stream manager must make two determinations. First, the stream manager 134 determines the future throughput of the slowest PE 235 after the corresponding CPU 205 is overclocked. Second, the stream manager 134 determines how much the other PE 235 on the compute node 130—i.e., the PE 235 that shares the same compute node 130 as the slowest PE 235—may be slowed without that PE 235 then becoming the slowest PE 235. This two-step inquiry is better illustrated by FIG. 8A-8B.

Figure 8A:
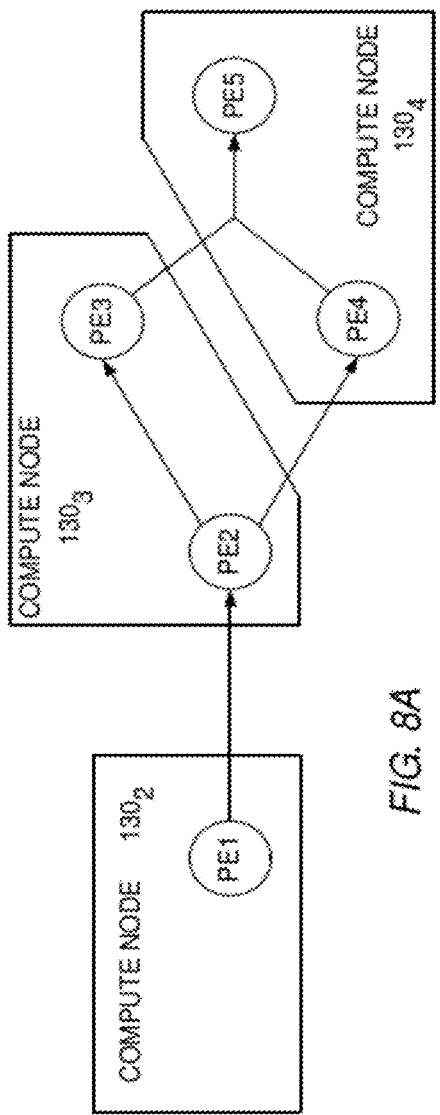
FIGS. 8A-8B illustrate examples of compute nodes in a stream application, according to one embodiment of the invention.
Figure 8B:
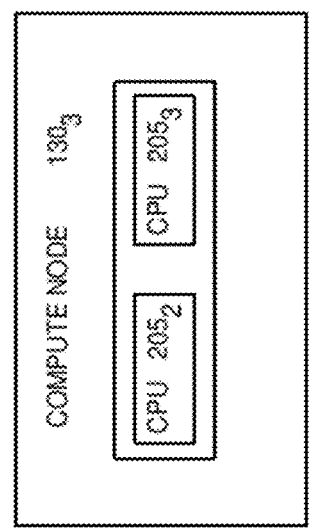

FIG. 8A-8B illustrate an operator graph and compute node, according to one embodiment of the invention. As shown in FIG. 8A, PE5 is the wait condition and PE3 is the slowest processing element 235. Also note that PE2 and PE3 are both found on the same compute node $130_3$, thereby satisfying step 750 of FIG. 7. Moreover, FIG. 8B shows a compute node $130_3$ with two separate CPUs (labeled as $205_2$ and $205_3$). Because both CPU $205_2$ and $205_3$ are located on the same compute node $130_3$, the extra energy used to overclock one CPU $205_3$ can be saved by underclocking the other CPU $205_2$. As used herein, "underclocking" refers to reducing a synchronous circuit's timing settings to run at a lower clock rate than it was specified to operate at. Assuming that PE2 and PE3 run exclusively on CPU $205_2$ and CPU $205_3$, respectively, then query 760 is also answered in the affirmative. However, before slowing PE2, the stream manager 134 determines the effect of speeding up PE3. For example, assume that overclocking CPU $205_3$ lowers the buffer-usage percentage of PE3 from 95% to 75%. Next, the stream manager 134 calculates what the buffer-usage percentage increase for PE2 will be once the associated CPU $205_2$ is underclocked—e.g., 30% to 65%. However, overclocking and underclocking these two processing elements 235 may require the stream manager 134 to predict the buffer-usage percentages for the other PEs 235 as well. The stream manager 134 should not underclock PE2 such that the associated buffer-usage percentage rises above the percentage of PE3. Doing so merely causes PE2 to become the slowest PE 235 and fails to increase throughput. Instead, the stream manager 134 can underclock PE2 up until the buffer-usage percentage equals either (1) the buffer-usage percentage of the second slowest PE 235 or (2) the new buffer-usage percentage of PE3 after being sped up. In the example above, because the buffer usage of overclocked PE3 is still higher than the buffer usage of underclocked PE2—i.e., PE3 is still slower than PE2—then throughput will increase and energy will be saved. Ideally, an underclocked CPU 205$_2$ will save as much, or more, energy than the energy required to overclock another CPU 205$_3$.

In another example, a massively parallel computer, such as Blue Gene/L, has several nodes stored in a single trunk, i.e., multiple independent computing elements stored in a chassis. Overclocking one of the processors associated with a node may increase the heat, and therefore, affect another node 130 located in the trunk (e.g., share the same heat-exchange). Also, the computing nodes in the trunk may share the same energy supply. Following the steps mentioned above, a component similar in function to the stream manager 134 would ascertain that underclocking one node would not decrease throughput. With that determination, one node may be overclocked while another is underclocked, thereby minimizing the necessary energy needed for overclocking or counteracting the additional heat produced by overclocking. In sum, the method described above is not limited to multiple processors contained within the same node.

In addition to counteracting the energy required to overclock by simultaneously underclocking a processing element or node, the additional energy required to overclock may be made up after the overclocking has stopped. For example, if PE3 of FIG. 8A was overclocked during a time T1, then PE2 may be underclocked at a separate time period T2. Advantageously, T2 may occur soon after T1. Thus, any extra heat generated during T1 would be countered by the decrease of heat generated during T2. Because PE3 is not currently being overclocked and is already known to be the cause of the bottleneck, then the buffer utilization of other processing elements (i.e., processing elements besides PE2 and PE3) need not be checked. Therefore, this aggressive cool down period permits PE2 to be underclocked until its buffer-usage percentage equals PE3—i.e., does not cause PE2 to become the slowest processing element 235.

Alternatively, a processor may be preemptively underclocked in anticipation of a need to overclock. Advantageously, this preemptively cooling prevents a temperature from rising beyond the normal operating temperature. For example, if a processor is overclocked and another is underclocked soon thereafter, then the temperature rises above the normal rate before quickly falling because of the aggressive cooling. In this embodiment, however, the temperature is dropped below the normal operating temperature before overclocking; thus, when overclocking is completed later, the temperature is back to the normal operating temperature. Or, at a minimum, the highest temperature experienced by the hardware in this embodiment is less than the temperature created by the method discussed above. To accomplish this, the stream manager 134 may delay overclocking until after a processor element 235 on the same node (or in the same chassis) has already been underclocked. Additionally, this process could be used in combination with one or more of the methods discussed above. Nonetheless, both strategies—i.e., aggressively cooling or preemptively cooling—counter the energy costs of speeding up of a processing element; however, the latter may prevent the heat from rising above normal. This advantageously prevents premature hardware failure.

Returning to FIG. 7, at step 795, if the answer to any of the queries of steps 750, 760, or 770 is no, then the process uses the method illustrated in steps 650-690 of FIG. 6. Otherwise, the process moves to step 780 and slows down a PE 235 that is not the slowest processing element 235. According to the several embodiments discussed above, at step 790, the slowest processing element 235 is sped up either simultaneously or before/after the other processing element is slowed down. This step may be performed using many of the same techniques as discussed with step 680 of FIG. 6. For example, a computer processor or RAM may be overclocked either aggressively or slightly. In either case, the overclocking may be temporary to avoid degeneration of hardware components. Moreover, the ratio of speeding up and slowing down the processing elements 235 does not need to be 1:1. Instead, any ratio that will save energy and still increase throughput may be used by this implementation of AEM.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of processing data in a stream application, comprising:
   receiving data to be processed by a plurality of processing elements, the processing elements processing at least a portion of the received data by operation of one or more computer processors;
   establishing an operator graph of processing elements, the operator graph defining at least one execution path and wherein each processing element of the operator graph is configured to receive data from at least one upstream processing element and transmit data to at least one downstream processing element;
   identifying a downstream processing element that receives data separately from at least two upstream processing elements; and
   upon identifying a wait condition where the downstream processing element receives data at different rates from the at least two upstream processing elements, speeding up the processing of at least one of the processing elements that precedes the downstream processing element in the at least one execution path.

2. The method of claim 1, further comprising, upon identifying the wait condition, slowing down the processing of at least one of the processing elements that precedes the downstream processing element in the execution path.

3. The method of claim 2, wherein the sped up processing element and the slowed down processing element are performed by a same compute node.

4. The method of claim 1, further comprises selecting the at least one of the processing elements to be sped up based on at least one of (i) historical data and (ii) a usage of a buffer associated with the at least one of the processing elements.

5. The method of claim 1, wherein speeding up the processing of a processing element comprises overclocking a hardware component associated with the sped up processing element.

6. The method of claim 1, wherein the processing elements are performed by at least two compute nodes, and wherein speeding up the processing of the at least one of the processing elements comprises transferring the at least one processing element to a different compute node.

7. The method of claim 1, wherein speeding up the execution of a processing element comprises speeding up the execution of at least one of the processing elements that provides data directly to the downstream processing element.

8. A computer program product for processing data in a stream application, the computer program product comprising:
a non-transitory computer-readable storage medium having computer-readable program code embodied therewith, the computer-readable program code comprising:
computer-readable program code configured to:
receive data to be processed by a plurality of processing elements, the processing elements processing at least a portion of the received data;
establish an operator graph of processing elements, the operator graph defining at least one execution path and wherein each processing element of the operator graph is configured to receive data from at least one upstream processing element and transmit data to at least one downstream processing element;
identify a downstream processing element that receives data separately from at least two upstream processing elements; and
upon identifying a wait condition where the downstream processing element receives data at different rates from the at least two upstream processing elements, speed up the processing of at least one of the processing elements that precedes the downstream processing element in the at least one execution path.

9. The computer program product of claim 8, further configured to, upon identifying the wait condition, slow down the processing of at least one of the processing elements that precedes the downstream processing element in the execution path.

10. The computer program product of claim 9, wherein the sped up processing element and the slowed down processing element are performed by a same compute node.

11. The computer program product of claim 8, further configured to select the at least one of the processing elements to be sped up based on at least one of (i) historical data and (ii) a usage of a buffer associated with the at least one of the processing elements.

12. The computer program product of claim 8, wherein speeding up the processing of a processing element comprises overclocking a hardware component associated with the sped up processing element.

13. The computer program product of claim 8, wherein the processing elements are performed by at least two compute nodes, and wherein speeding up the processing of the at least one of the processing elements comprises transferring the at least one processing element to a different compute node.

14. The computer program product of claim 8, wherein speeding up the execution of a processing element comprises speeding up the execution of at least one of the processing elements that provides data directly to the downstream processing element.

15. A system in a data streaming environment, comprising:
a computer processor; and
a memory containing a program that, when executed on the computer processor, processes data in a stream application, comprising:
receiving data to be processed by a plurality of processing elements, the processing elements processing at least a portion of the received data;
establishing an operator graph of processing elements, the operator graph defining at least one execution path and wherein each processing element of the operator graph is configured to receive data from at least one upstream processing element and transmit data to at least one downstream processing element;
identifying a downstream processing element that receives data separately from at least two upstream processing elements; and
upon identifying a wait condition where the downstream processing element receives data at different rates from the at least two upstream processing elements, speeding up the processing of at least one of the processing elements that precedes the downstream processing element in the at least one execution path.

16. The system of claim 15, the program further comprises, upon identifying the wait condition, slowing down the processing of at least one of the processing elements that precedes the downstream processing element in the execution path.

17. The system of claim 16, wherein the sped up processing element and the slowed down processing element are performed by a same compute node.

18. The system of claim 15, the program further comprising selecting the at least one of the processing elements to be sped up based on at least one of (i) historical data and (ii) a usage of a buffer associated with the at least one of the processing elements.

19. The system of claim 15, wherein speeding up the processing of a processing element comprises overclocking a hardware component associated with the sped up processing element.

20. The system of claim 15, wherein the processing elements are performed by at least two compute nodes, and wherein speeding up the processing of the at least one of the processing elements comprises transferring the at least one processing element to a different compute node.

21. The system of claim 15, wherein speeding up the execution of a processing element comprises speeding up the execution of at least one of the processing elements that provides data directly to the downstream processing element.

* * * * *